United States Patent
Kim et al.

(10) Patent No.: US 9,520,589 B2
(45) Date of Patent: Dec. 13, 2016

(54) SECONDARY BATTERY OF IMPROVED LEAD STRUCTURE

(71) Applicant: LG Chem, Ltd., Seoul (KR)

(72) Inventors: Ji-Hyun Kim, Daejeon (KR); Bo-Hyun Kim, Daejeon (KR)

(73) Assignee: LG Chem, Ltd. (KR)

(*) Notice: Subject to any disclaimer, the term of this patent is extended or adjusted under 35 U.S.C. 154(b) by 23 days.

(21) Appl. No.: 13/753,901

(22) Filed: Jan. 30, 2013

(65) Prior Publication Data

US 2013/0143109 A1    Jun. 6, 2013

Related U.S. Application Data

(63) Continuation of application No. PCT/KR2011/006050, filed on Aug. 17, 2011.

(30) Foreign Application Priority Data

Aug. 17, 2010  (KR) .................. 10-2010-0079436

(51) Int. Cl.
*H01M 2/02*   (2006.01)
*H01M 2/30*   (2006.01)
(Continued)

(52) U.S. Cl.
CPC ............... *H01M 2/30* (2013.01); *H01M 2/263* (2013.01); *H01M 2/266* (2013.01);
(Continued)

(58) Field of Classification Search
CPC ........ H01M 2/30; H01M 2/266; H01M 2/263; H01M 2/021; H01M 2/0212; H01M 10/0413; H01M 10/0431
(Continued)

(56) References Cited

U.S. PATENT DOCUMENTS 4,049,882 A * 9/1977 Beatty ......................... 429/94
6,461,757 B1  10/2002 Sasayama et al.
(Continued)

FOREIGN PATENT DOCUMENTS

EP    1901387 A2    3/2008
JP    H09147830 A    6/1997
(Continued)

OTHER PUBLICATIONS

International Search Report dated Mar. 7, 2012 for PCT/KR2011/006050.
(Continued)

*Primary Examiner* — Nicholas P D'Aniello
*Assistant Examiner* — Jimmy K Vo
(74) *Attorney, Agent, or Firm* — Lerner, David, Littenberg, Krumholz & Mentlik, LLP (57) ABSTRACT

Disclosed is a secondary battery of an improved lead structure including an electrode assembly including a cathode plate having a cathode tab, an anode plate having an anode tab, and a separator stacked in an alternate manner, a battery casing to receive the electrode assembly, a cathode lead electrically connected to the cathode tab, and an anode lead electrically connected to the anode tab, wherein at least one electrode tab of the cathode tab and the anode tab is electrically connected to the corresponding electrode lead at a plurality of joints and the number of the electrode leads is smaller than the number of the joints between the electrode tab and the electrode lead.

9 Claims, 10 Drawing Sheets (a)

(51) Int. Cl.
*H01M 2/26* (2006.01)
*H01M 10/04* (2006.01)

(52) U.S. Cl.
CPC ... *H01M 10/0413* (2013.01); *H01M 10/0431* (2013.01); *H01M 2/021* (2013.01); *H01M 2/0212* (2013.01)

(58) Field of Classification Search
USPC .............. 429/127, 161–163, 178–184, 211; 29/623.1–623.4
See application file for complete search history.

(56) References Cited

U.S. PATENT DOCUMENTS

| | | | |
|---|---|---|---|
| 8,034,478 B2 | 10/2011 | Lee et al. | |
| 2003/0031923 A1* | 2/2003 | Aoshima et al. | 429/127 |
| 2004/0258986 A1* | 12/2004 | Shen et al. | 429/161 |
| 2008/0060189 A1 | 3/2008 | Daidoji et al. | |
| 2008/0241680 A1 | 10/2008 | Lee et al. | |
| 2009/0197162 A1 | 8/2009 | Shinyashiki et al. | |

FOREIGN PATENT DOCUMENTS

| | | |
|---|---|---|
| JP | H09-213299 A | 8/1997 |
| JP | 20000076434 A | 12/2000 |
| JP | 2006-351373 A | 12/2006 |
| JP | 200866170 A | 3/2008 |
| KR | 100571270 B1 | 4/2006 |
| KR | 100716596 B1 | 5/2007 |
| KR | 100813813 B1 | 3/2008 |
| KR | 20080109948 A | 12/2008 |
| WO | 2008/013381 A1 | 1/2008 |
| WO | 2009/031442 A1 | 3/2009 |

OTHER PUBLICATIONS

Office Action from corresponding European Appln. No. 11818404.3, dated Apr. 13, 2015.

* cited by examiner

SECONDARY BATTERY OF IMPROVED LEAD STRUCTURE

CROSS-REFERENCE TO RELATED APPLICATION

This application is a continuation of International Application PCT/KR2011/006050 filed on Aug. 17, 2011, which claims priority from Korean Patent Application No. 10-2010-0079436, filed on Aug. 17, 2010, the entire disclosure of which is incorporated herein by reference for all purposes.

BACKGROUND

1. Field

The present invention relates to a secondary battery of an improved electrical structure, and more particularly, to a secondary battery in which the structure of a lead connected to a tab is adaptively improved to enhance the electrical characteristics and performance of the secondary battery in a high capacity environment.

2. Description of Related Art

Secondary batteries have high applicability depending on the product group and excellent electrical characteristics such as high energy density, and thus are commonly used as electric power sources of electric vehicles (EVs) and hybrid vehicles (HVs) as well as mobile devices.

These secondary batteries can radically decrease the use of fossil fuels and also have the advantage of not generating any by-products that come with energy consumption. For these reasons, secondary batteries improve energy efficiency, are environmentally friendly, and are gaining attention as a new alternative energy source.

Secondary batteries (cells) may be classified into pouch-type batteries, cylindrical batteries, prismatic batteries, and the like, based on the type or structure of a casing. Also, secondary batteries may be sorted into jelly-roll (winding) type batteries, stack type batteries, stack/folding type batteries, and the like, based on the structural characteristics of an electrode assembly. Since these types of batteries have corresponding basic principles and configurations, a structure of a secondary battery is briefly described below with reference to FIGS. 1 to 4 illustrating pouch-type secondary batteries.

Figure 1:
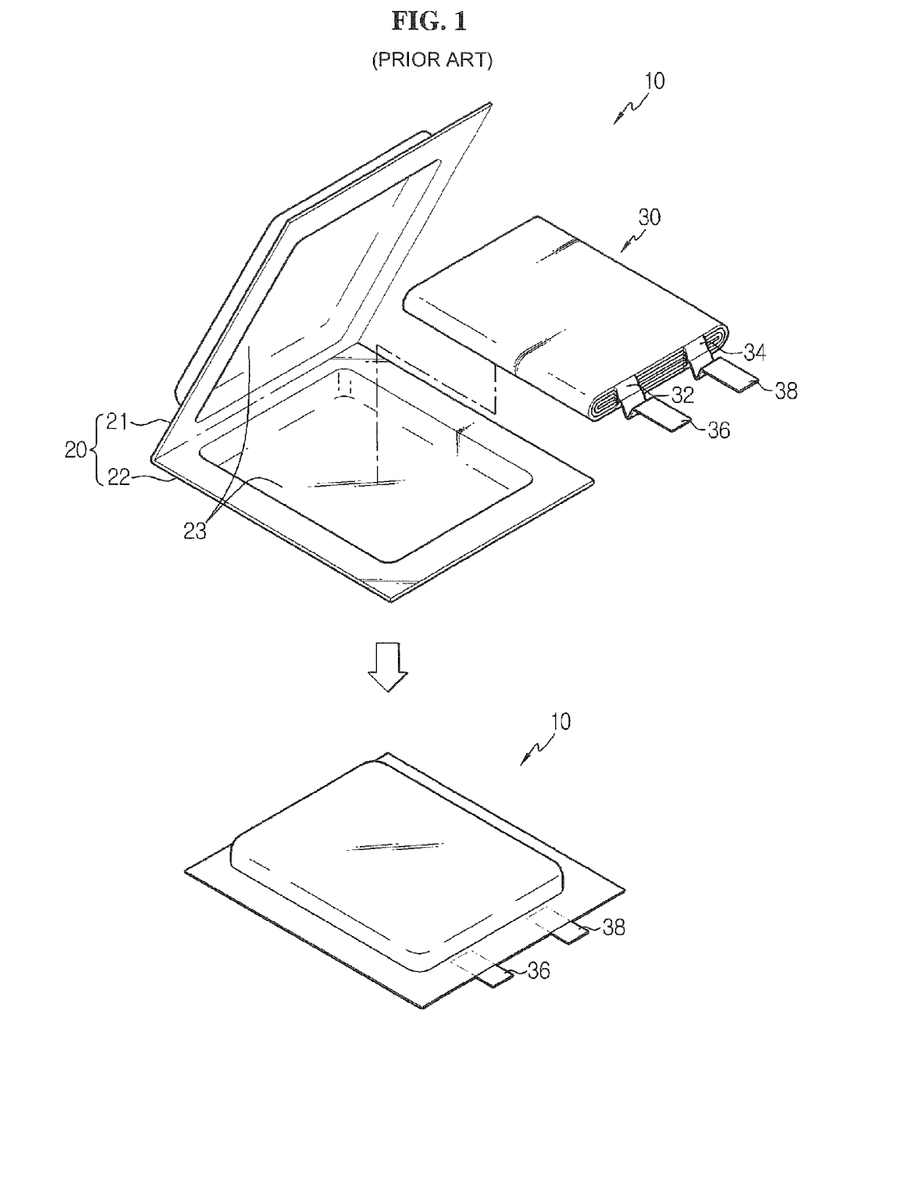
FIG. 1 is a view illustrating a basic structure of a conventional secondary battery.

Referring to FIG. 1, a pouch-type secondary battery 10 basically includes a pouch-shaped battery casing 20 and an electrode assembly 30, also called an electrode current collector.

Figure 2:
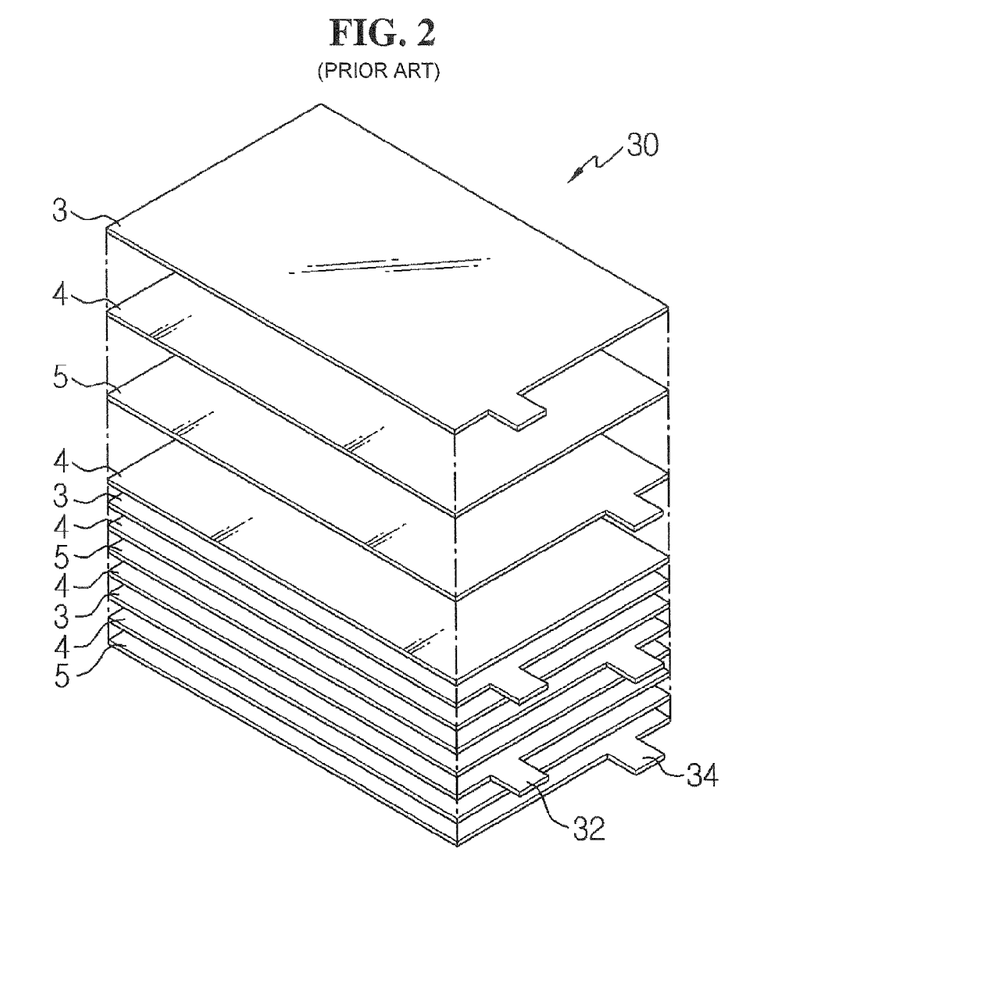
FIG. 2 is a view illustrating a stack structure in an electrode assembly of a conventional secondary battery.

The electrode assembly 30 includes a cathode plate 3, an anode plate 5, and a separator 4 interposed therebetween to electrically insulate the cathode plate 3 from the anode plate 5, as shown in FIG. 2.

Figure 3:
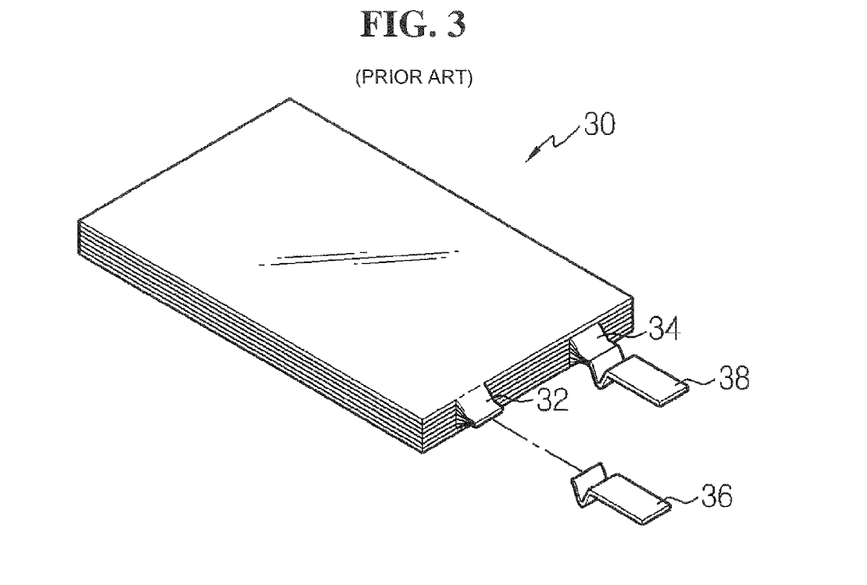
FIG. 3 is a view illustrating a tab-lead connection structure of a conventional secondary battery.

The cathode plate 3 has a cathode tab 32 formed on at least one area of the cathode plate 3, and the anode plate 5 has an anode tab 34 formed on at least one area of the anode plate 5. As shown in FIG. 3, at least one cathode tab 32 and at least one anode tab 34 are converged in a predetermined direction and coupled to a conductive cathode lead 36 and a conductive anode lead 38, respectively, for example, by resistance welding, ultrasonic welding, laser welding, rivets, and the like.

By coupling to the electrode tabs 32 and 34, the electrode leads 36 and 38 serve as a predetermined electrode interface to electrically connect the secondary battery 10 to external devices.

Figure 4:
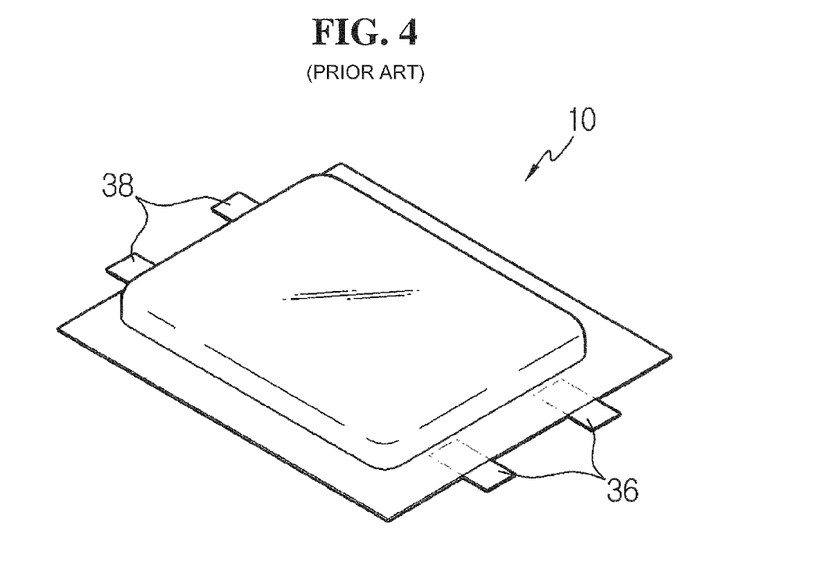
FIG. 4 is a view illustrating a structure of another conventional secondary battery.

As shown in FIG. 4, the secondary battery 10 may include a plurality of the cathode tabs 32 and the anode tabs 34 having different directions, and in this instance, the number of the electrode leads 36 and 38 electrically connected to the electrode tabs 32 and 34 corresponds to the number of the electrode tabs 32 and 34.

The electrode assembly 30 is mounted in an inner space 23 of the pouch-shaped casing 20 as shown in FIG. 1, and subsequently, an electrolyte is injected, followed by post-processing such as sealing, aging, forming, and the like, resulting in a secondary cell.

Although FIG. 1 shows the two-part pouch-shaped casing 20 of an upper casing 21 and a lower casing 22 divided based on the relative location and the receiving space 23 formed in both of the casings 21 and 22 to receive the electrode assembly 30 therein, the present invention is not limited in this regard.

It is obvious to a person having ordinary skill in the art that a variety of combinations or modifications may be made to a casing, for example, an integrated casing or a two-part casing, or to a space for receiving an electrode assembly, depending on the raw material of the casing, properties or specification of a product, processing conditions, and the like.

An individual secondary battery is referred to as a cell, and a group of secondary batteries is referred to as a battery assembly or a battery pack. Unless otherwise mentioned in the present specification, a secondary battery is defined not only as a cell, but also as a battery assembly or a battery pack.

Recently, as secondary batteries are needed and used in a high capacity environment for HVs, EVs, or for energy storage, the size and capacity of secondary batteries is also increasing However, since secondary batteries are repetitively charged/discharged by electrochemical reactions, the heat generated during charge/discharge dramatically increases with increasing battery capacity. The heat generation may fatally deteriorate the performance of secondary batteries allowing electrochemical reactions.

To adapt to the high capacity condition of secondary batteries, increasing the number or the size of tabs and leads has been used. However, simply increasing the physical environment of tabs and leads does not achieve a stable and reliable joint between the tabs and the leads.

Moreover, as the number of tabs and leads increases, the number of joints therebetween increases. In the case the number of joints between different physical elements such as above increases, the manufacturing process becomes more complex and a non-uniform electrical characteristic such as an electrical resistance may result, which may be a significant hindering factor in continuously maintaining the normal performance of secondary batteries.

The non-uniform resistance leads to local or partial heat generation or side reactions. The local or partial heat generation may hinder the uniform performance and accelerate the degradation rate of secondary batteries.

Also, simply enlarging an electrode structure to improve the resistance characteristics may cause a short circuit between electrodes when swelling occurs or external physical impacts are applied. Accordingly, there is a need to generally and comprehensively solve the foregoing problems in consideration of high capacity environment where secondary batteries may be placed.

DISCLOSURE

The present invention is designed to solve the conventional problems above, and therefore it is an object of the present invention to provide a secondary battery having a structural improvement of a lead in the electrical connection relationship with a tab to improve the applicability in a high capacity environment and strongly cope with local or partial heat generation and deterioration in the performance of the battery caused thereby.

Additional features of the invention will be set forth in the description which follows, and in part will be apparent from the description, or may be learned by practice of the invention.

In order to achieve this object, provided is a secondary battery of an improved lead structure including an electrode assembly including a cathode plate with a cathode tab, an anode plate with an anode tab, and a separator, stacked in an alternate manner, a battery casing to receive the electrode assembly, a cathode lead electrically connected to the cathode tab, and an anode lead electrically connected to the anode tab, wherein at least one electrode tab of the cathode tab and the anode tab is electrically connected to the corresponding electrode lead at a plurality of joints and the number of the electrode leads is smaller than the number of the joints between the electrode tab and the electrode lead.

The electrode tab may be electrically connected to the electrode lead at two joints and the number of the electrode lead may be one.

The electrode tab may be electrically connected to the electrode lead at a plurality of joints, and in this instance, the electrode tab and the electrode lead may include the cathode tab and the cathode lead and/or the anode tab and the anode lead.

According to the preferred embodiment, a portion of the electrode tab may be electrically connected to one surface of the electrode lead and the other portion of the electrode tab may be electrically connected to the other surface of the electrode lead.

In this instance, the electrode tab located above the electrode lead may be electrically connected to the upper surface of the electrode lead, and the electrode tab located below the electrode lead may be electrically connected to the lower surface of the electrode lead.

The electrode assembly may include at least two unit assemblies having the electrode tabs of different directions, the electrode tab of the unit assembly located above the electrode lead may be electrically connected to the upper surface of the electrode lead, and the electrode tab of the unit assembly located below the electrode lead may be electrically connected to the lower surface of the electrode lead.

According to the preferred embodiment, the cathode lead or the anode lead may have a thickness of 50 to 500 μm, and the cathode lead or the anode lead may have a width of 2 to 20 cm.

DESCRIPTION OF DRAWINGS

The accompanying drawings illustrate preferred embodiments of the present disclosure and together with the foregoing disclosure, serve to provide further understanding of the technical spirit of the present disclosure. However, the present disclosure is not to be construed as being limited to the drawings.

DETAILED DESCRIPTION

The present invention will now be described in detail with reference to the accompanying drawings. Prior to the description, it should be understood that terms and words used in the specification and the appended claims should not be construed as having common and dictionary meanings, but should be interpreted as having meanings and concepts corresponding to technical ideas of the present invention in view of the principle that the inventor can properly define the concepts of the terms and words in order to describe his/her own invention as best as possible.

Accordingly, the description proposed herein is just a preferable example for the purpose of illustrations only, not intended to limit the scope of the invention, so it will be apparent to those skilled in the art that various modifications and variation can be made in the present invention without departing from the spirit or scope of the invention.

Figure 5:
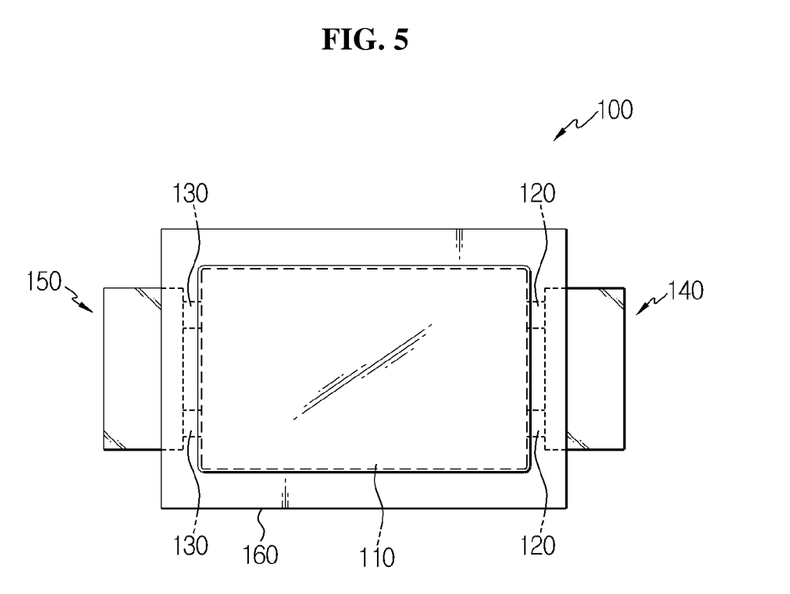
FIG. 5 is a view illustrating a structure of a secondary battery according to an embodiment of the present invention.

FIG. 5 illustrates each element of a secondary battery of an improved lead structure (hereinafter referred to as a secondary battery) 100 according to an embodiment of the present invention. As shown in FIG. 5, the secondary battery 100 according to an embodiment of the present invention has an electrode assembly 110, a cathode tab 120, an anode tab 130, a cathode lead 140, an anode lead 150, and a battery casing 160.

As described above, the electrode assembly 110 includes a cathode plate 50, an anode plate 51, and a separator having a predetermined shape interposed therebetween that are alternately stacked on top of each other, and the detailed description will be made below with reference to FIGS. 6 to 8. It is obvious that according to embodiments, various types of electrode assemblies may be applied, for example, winding type, stack type, stack/folding type, and the like.

The cathode plate 50 is mainly made of aluminum, but may be made of stainless steel, nickel, titanium, sintered carbon, aluminum, or stainless steel surface-treated with carbon, nickel, titanium or silver. The material for the cathode plate 50 is not particularly limited to the exemplary materials as long as it has high conductivity and does not cause a chemical change to the secondary battery.

The cathode plate 50 has at least one cathode tab 120 formed on a certain area. The cathode tab 120 may be formed by extending the cathode plate 50 or by welding a conductive member to a certain area of the cathode plate 50. Also, the cathode tab 120 may be formed by applying a cathode material to a certain area of the periphery of the cathode plate 50, followed by drying.

The anode plate 51, the opposite of the cathode plate 50, is mainly made of copper, but may be made of stainless steel, aluminum, nickel, titanium, sintered carbon, copper, stainless steel surface-treated with carbon, nickel, titanium, or silver, or aluminum-cadmium alloy.

The cathode plate 50 and the anode plate 51 may have a micro concavo-convex structure on the surface thereof to improve the bond strength of an active material. It is obvious that the micro concavo-convex structure may take various forms of a film, a sheet, a foil, a microporous structure, a foam, a non-woven structure, and the like.

Like the cathode plate 50, the anode plate 51 has at least one anode tab 130 formed on a certain area. Like the cathode tab 120, the anode tab 130 may be formed by extending the anode plate 51 or by welding a conductive member to a certain area of the anode plate 51. Also, the anode tab 130 may be formed by applying an anode material to a certain area of the periphery of the anode plate 51, followed by drying.

At least one cathode tab 120 and at least one anode tab 130 are respectively formed at the cathode plate 50 and the anode plate 51. The electrode tabs 120 and 130 are converged in a predetermined direction and electrically connected to the corresponding electrode leads 140 and 150, respectively.

In other words, one end of each of the electrode leads 140 and 150 is connected to the corresponding electrode tab 120 and 130, and the other end is exposed to the outside of the battery casing 160. In this configuration, the electrode lead 140 and 150 functions as a terminal to electrically connect the secondary battery 100 to external devices.

According to the present invention, to disperse the electric current flow during high current charging/discharging, improve the electrical characteristics such as electric resistance, and facilitate the tab-lead electrical connection, a plurality of the electrode tabs 120 and 130 are electrically connected to the electrode leads 140 and 150 at a plurality of joints. In this instance, the number of the electrode leads 140 and 150 is smaller than the number of the electrode tabs 120 and 130.

As shown in FIG. 5, two electrode tabs having different directions are electrically connected to one electrode lead. According to alternative embodiments applicable by a person having ordinary skill in the art, four electrode tabs may be electrically connected to three, two, or one electrode lead that is smaller than the number of the electrode tabs.

Considering an electrode tab forming process, the subject to which the secondary battery is applied, the welding efficiency, and the like, most preferably the number of at least one electrode tab of the cathode tab 120 and the anode tab 130 is two and the number of the electrode lead 140 and 150 connected to the electrode tab 120 and 130 is one, and the electrode tab 120 and 130 and the electrode lead 140 and 150 are electrically connected at two joints.

Meanwhile, the electrode tab and the electrode lead constituting the cathode are mainly made of aluminum that has lower electrical conductivity and higher electric resistance than copper used for the anode.

Accordingly, to effectively prevent the non-uniform resistance between the cathode and the anode and local or partial heat generation resulting therefrom and to maintain the equality in electrical characteristics between the cathode and the anode, improvements may be preferably implemented in the cathode rather than the anode. However, this is given for the purpose of illustration only, and for example, improvements may be implemented in either the cathode or the anode or both.

Hereinafter, various examples of the electrode tab 120 and 130 of the secondary battery according to the present invention are described with reference to FIGS. 6 to 8.

The cathode tab and cathode lead have structures equal or similar to those of the anode tab and anode lead, and thus it is obvious that the description about an electrode plate, an electrode tab, and an electrode lead is applied to both a cathode and an anode.

As described above, the electrode assembly 110 includes the cathode plate 50, the anode plate 51, and the separator, that are stacked in alternate manner. For the purpose of convenience and easy understanding, in FIGS. 6 to 8, the cathode plate 50 and the anode plate 51 are mainly illustrated.

According to embodiments of the present invention, the electrode tabs 120 and 130 of the electrode assembly 110 may vary in direction and number. According to an embodiment, as shown in FIG. 6, when stacking the cathode plate 50 with the cathode tab 120 and the anode plate 51 with the anode tab 130 in an alternate manner such that the electrode assembly 110 includes a plurality of the cathode tabs 120 having different directions at one side thereof and a plurality of the anode tabs 130 having different directions at the other side, the electrode tabs 120 and 130 have two directions. For this purpose, two types of the electrode plates 50 and 51 may be used or the electrode plates 50 and 51 may be turned over.

Figure 7:
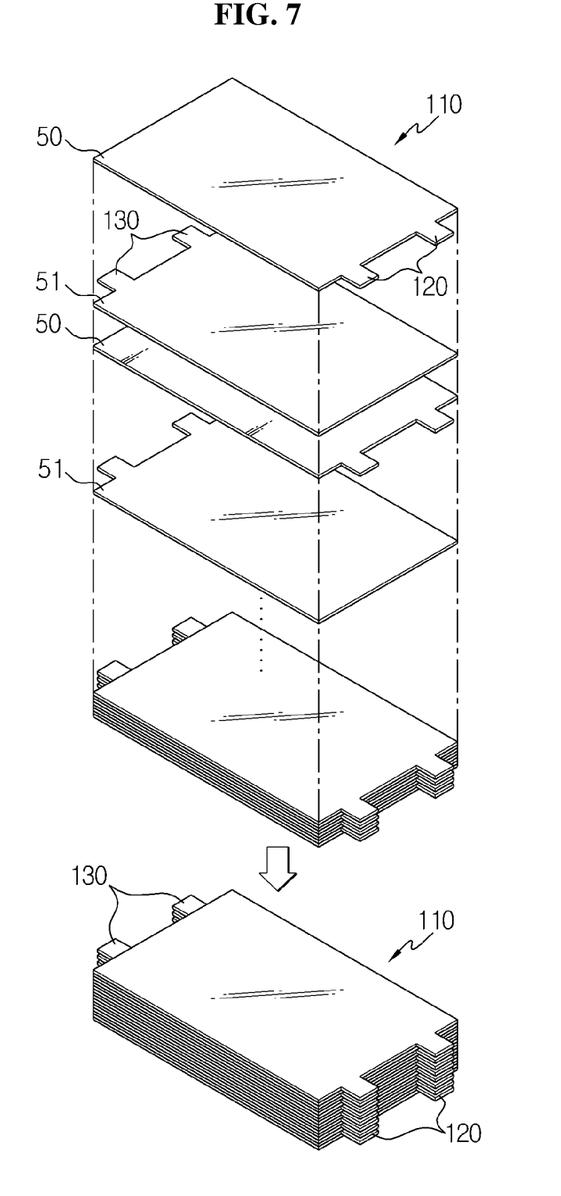
FIG. 7 is a view illustrating a stack structure in an electrode assembly according to another embodiment of the present invention.

According to another embodiment, as shown in FIG. 7, when stacking the cathode plate 50 with a plurality of the cathode tabs 120 and the anode plate 51 with a plurality of the anode tabs 130 in an alternate manner such that the electrode tabs 120 and 130 have different directions, the electrode assembly 110 includes a plurality of the electrode tabs 120 and 130 having different directions at the opposite sides thereof.

Figure 8:
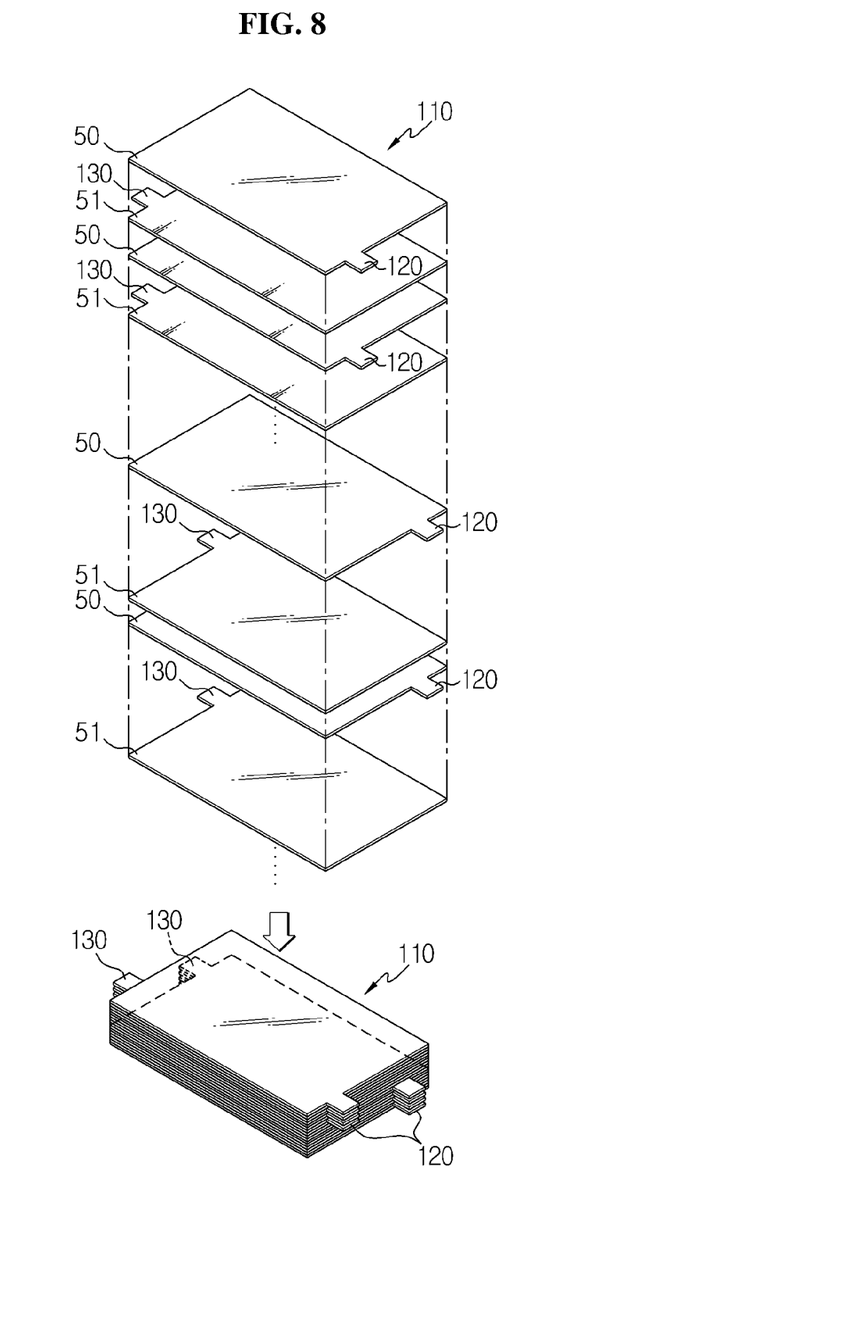
FIG. 8 is a view illustrating a stack structure in an electrode assembly according to still another embodiment of the present invention.

According to another embodiment, as shown in FIG. 8, the electrode tabs 120 and 130 located at the upper portion of the electrode assembly 110 have one direction and the electrode tabs 120 and 130 located at the lower portion of the electrode assembly 110 have the other direction.

In this case, the present invention is not limited in this regard. For example, the cathode tab 120 located at the upper portion of the electrode assembly 110 and the anode tab 130 located at the lower portion may have a direction different from that of FIG. 8, and the cathode tab 120 located at the lower portion of the electrode assembly 110 and the anode tab 130 located at the upper portion may have a direction different from that of FIG. 8. Also, the present invention is not limited to a specific number of electrode tabs in each electrode plate, and a larger number of electrode tabs than those of FIGS. 6 to 8 may be used.

Figure 6:
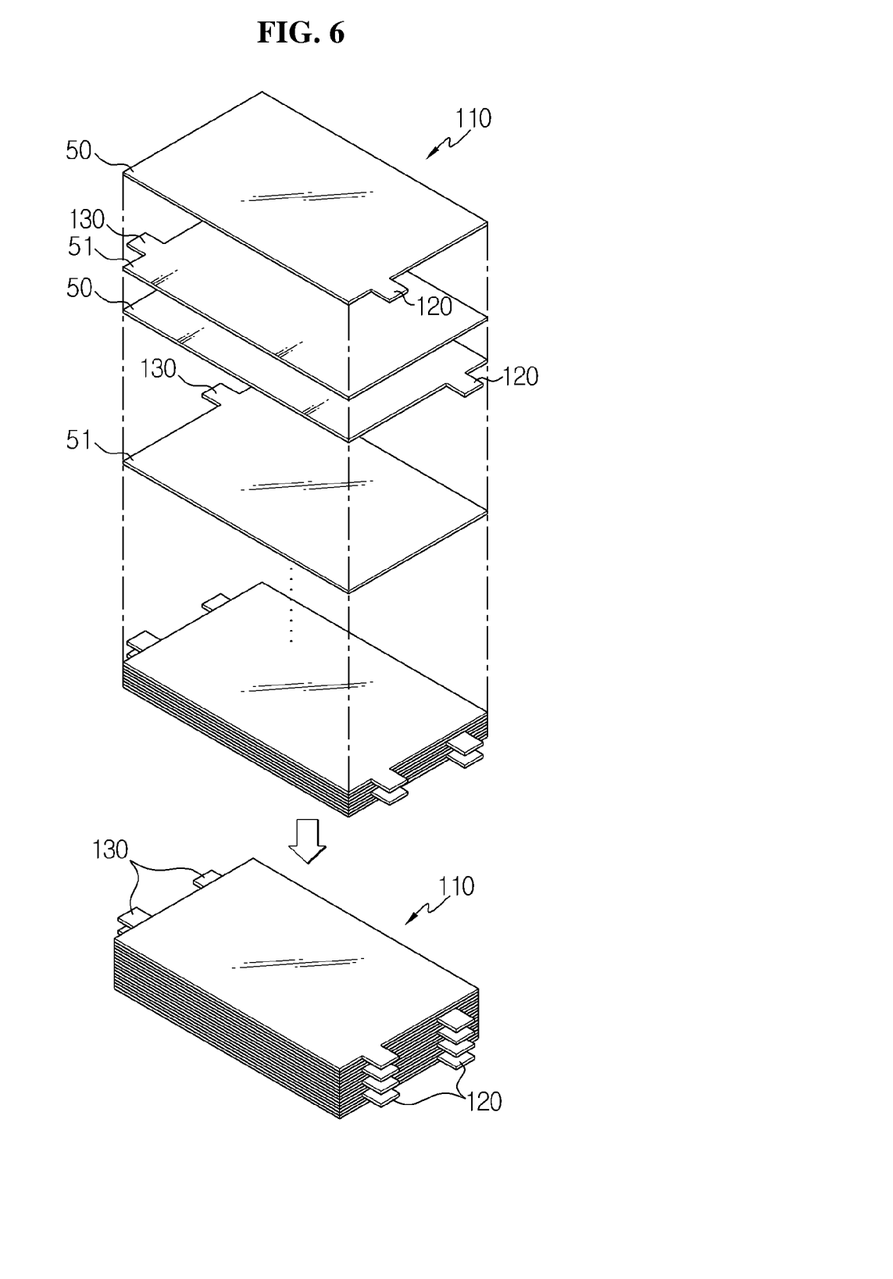
FIG. 6 is a view illustrating a stack structure in an electrode assembly according to an embodiment of the present invention.

It is obvious that a variety of combinations or modifications may be made to the secondary battery depending on the direction and number of the electrode tabs according to the embodiments of FIGS. 6 to 8 or combinations thereof or alternative embodiments applicable by a person having ordinary skill in the art.

Although FIGS. 5 to 8 show the electrode tabs 120 and 130 only arranged at the short side of the battery casing 160 but not at the long side of the battery casing 160, the present invention is not limited in this regard. For example, the electrode tabs 120 and 130 and the electrode leads 140 and 150 may be arranged at the long side of the battery casing 160.

Also, although FIGS. 5 to 8 show the electrode tabs 120 and 130 arranged at the opposite sides of the battery casing 160, the present invention is not limited in this regard. For example, the cathode tab 120 and the cathode lead 140 may be arranged at the long side of the battery casing 160 and the anode tab 130 and the anode lead 150 may be arranged at the short side of the battery casing 160, and vice versa.

Figure 9:
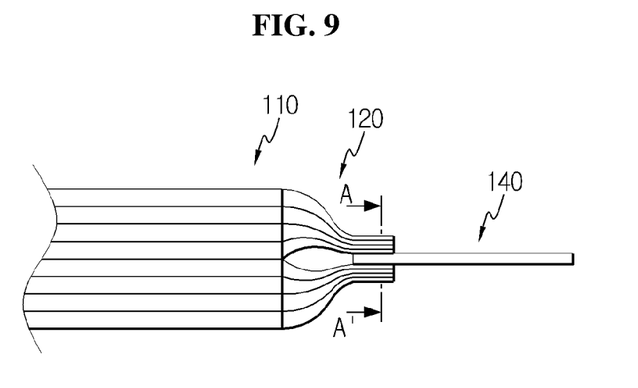
FIG. 9 is a view illustrating a tab-lead connection structure according to an embodiment of the present invention.

The electrode tabs 120 and 130 and the electrode leads 140 and 150 according to various embodiments of the present invention may be electrically connected in various ways, preferably with the electrode leads 140 and 150 sandwiched between the electrode tabs 120 and 130 as shown in FIG. 9.

As described above, a plurality of the electrode tabs 120 and 130 are converged in a predetermined direction and electrically connected to the electrode leads 140 and 150. In consideration of the stress and softness of metal materials, the possibility that outer electrode tabs may be disconnected during converging, the difficulty in selecting a welding position due to different heights of the metal tabs, the deterioration in electrical characteristics, and the like, the electrode lead 140 and 150 is preferably interposed between the electrode tabs 120 and 130, as shown in FIG. 9, to effectively prevent the characteristics from deteriorating due to the convergence of the electrode tabs 120 and 130.

Since a portion of the electrode tab is electrically connected to one surface of the electrode lead and the other portion of the electrode tab is electrically connected to the other surface of the electrode lead, a coupling process may be simplified and electric resistance may be dispersed to meet the high capacity conditions.

Figure 10:
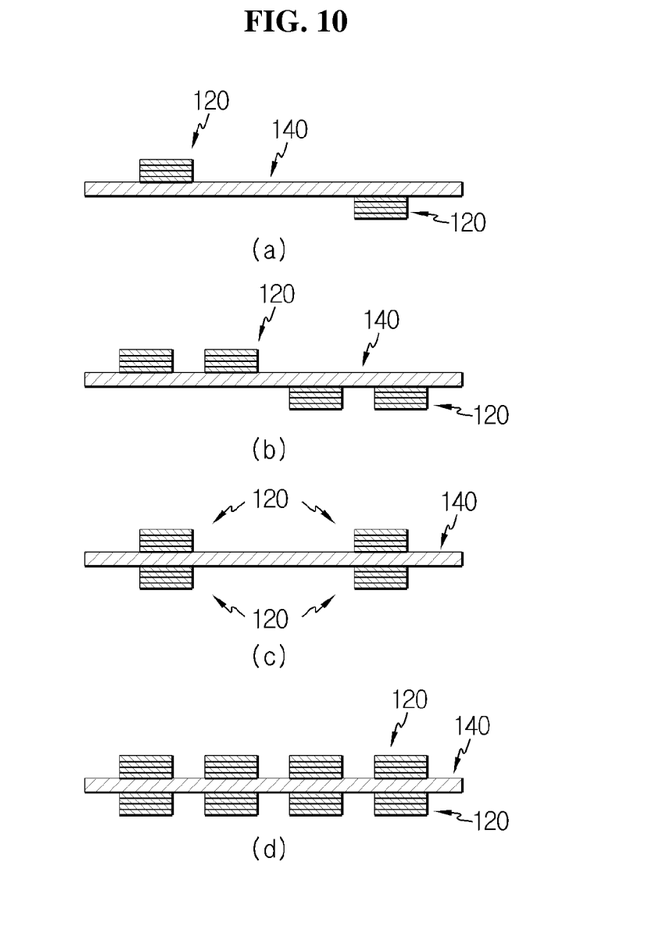
FIG. 10 is a cross-sectional view of FIG. 9, taken along the line A-A'.

FIG. 10 is a cross-sectional view of FIG. 9 taken along the line A-A'. As described above, the electrode tabs 120 and 130 and the electrode leads 140 and 150 according to various embodiment of the present invention may be connected in various manners. To establish a more efficient electrical connection between the electrode tab 120 and 130 and the electrode lead 140 and 150, preferably the electrode tab 120 and 130 located above the corresponding electrode lead 140 and 150 may be electrically connected to the upper surface of the electrode lead 140 and 150, and the electrode tab 120 and 130 located below the corresponding electrode lead 140 and 150 may be electrically connected to the lower surface of the electrode lead 140 and 150. For the convenience of illustration, only the cathode tab 120 and the cathode lead 140 are illustrated in FIGS. 9 and 10, however it is obvious that the same may be applied to the anode tab 130 and the anode lead 150.

Specifically, referring to FIGS. 10(*a*) and (*b*), the electrode tabs 120 and 130 located at the upper and lower portions of the electrode assembly 110 have different directions. The cathode tab 120 of the upper portion is connected to the upper surface of the cathode lead 140 and the cathode tab 120 of the lower portion is connected to the lower surface of the cathode lead 140.

In FIG. 10(*a*), the cathode tab 120 of each of the upper and lower portions has one direction, and in FIG. 10(*b*), the cathode tab 120 of each of the upper and lower portions has two directions.

Referring to FIGS. 10(*c*) and (*d*), the cathode plate has a plurality of cathode tabs 120. In FIG. 10(*c*), the cathode plate has two cathode tabs 120, and in FIG. 10(*d*), the cathode plate has four cathode tabs 120. The cathode tab 120 located at the upper portion of the electrode assembly 110 is connected to the upper surface of the cathode lead 140, and the cathode tab 120 located at the lower portion is connected to the lower surface of the cathode lead 140.

Figure 11:
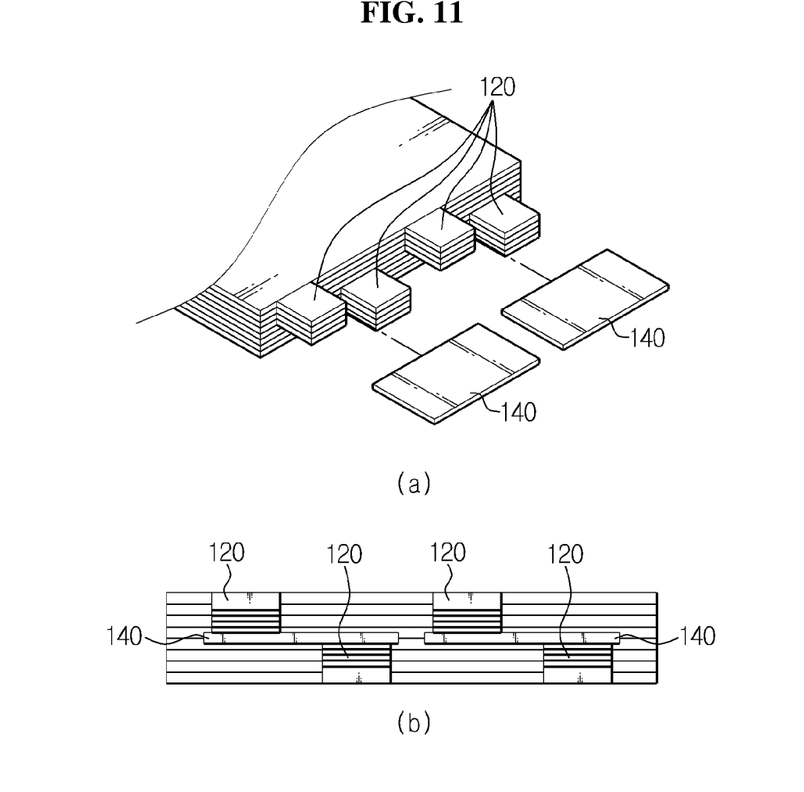
FIG. 11 is a view illustrating a tab-lead connection structure according to another embodiment of the present invention.

According to another embodiment, as shown in FIG. 11, a plurality of the cathode tabs 120 have different locations and a plurality of the cathode leads 140 are interposed between the cathode tabs 120 for each location. Although FIG. 11 shows two cathode leads 140, a single cathode lead 140 may be used.

FIGS. 10 and 11 are just preferable examples for the purpose of illustrations only, so it should be understood that various examples of tab-lead connection structures according to the embodiments of FIGS. 6 to 8 or combinations thereof are obvious.

Figure 12:
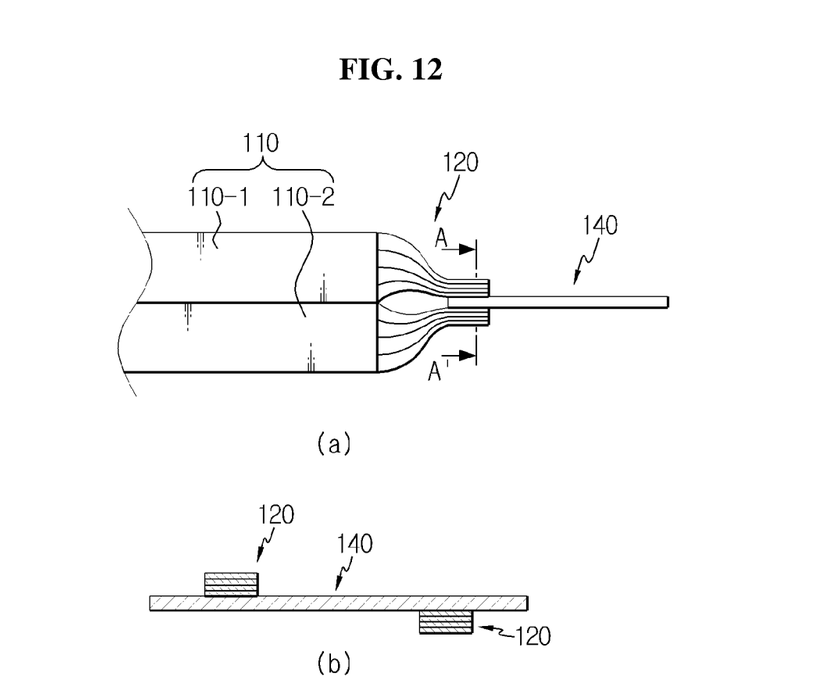
FIG. 12 is a view illustrating a tab-lead connection structure according to still another embodiment of the present invention.

To improve the procedural efficiency, as shown in FIG. 12, when the electrode assembly 110 includes two or more unit assemblies having electrode tabs of different directions, preferably the cathode tab 120 of the unit assembly located above the corresponding cathode lead 140 is electrically connected to the upper surface of the cathode lead 140, and the cathode tab 120 of the unit assembly located below the corresponding cathode lead 140 is electrically connected to the lower surface of the cathode lead 140.

Figure 13:
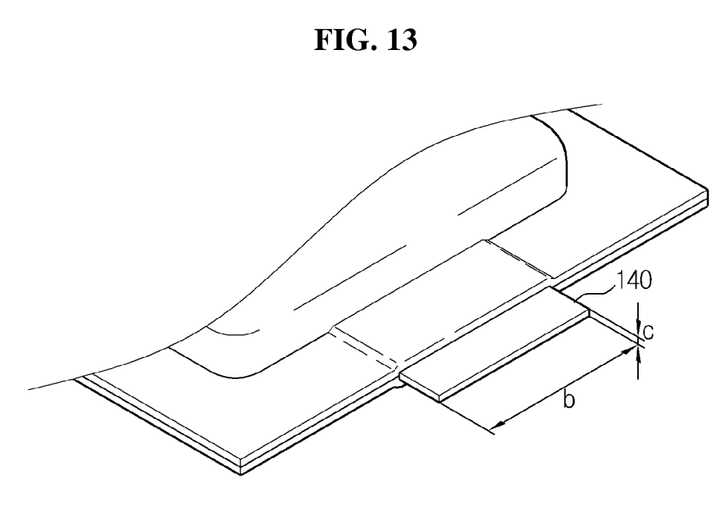
FIG. 13 is a view illustrating a shape of a lead according to an embodiment of the present invention.

Referring to FIG. 13, preferably the cathode or anode lead used in the present invention may have a thickness (c) of 50 to 500 μm and a width (b) of 2 to 20 cm.

When the dimensions are below the ranges, as an electric current flowing through the electrode tab and the electrode lead increases in magnitude, heat generation increases, so that the secondary battery is more likely to operate abnormally. As a result, the service life of the secondary battery reduces, resulting in reduced efficiency and safety.

When the dimensions exceed the ranges, it is difficult to maintain the tab-lead electrical connection uniformly and stably, and there may be a reduction in sealing efficiency and problems caused thereby, such as, for example, moisture permeation, electrolyte leakage, and the like.

It will be apparent that the terms 'upper' and 'lower' described herein are merely understood in the instrumental concept to relatively indicate or define the elements or components.

Although the present invention has been described hereinabove, it should be understood that the detailed description and specific examples, while indicating preferred embodiments of the invention, are given by way of illustration only, since various changes and modifications within the spirit and scope of the invention will become apparent to those skilled in the art from this detailed description.

INDUSTRIAL APPLICABILITY

The improved lead structure according to the present invention may optimize the terminal connection resistance and effectively disperse or uniformize a difference in polarity under high current and high capacity conditions, thereby improving the performance of the secondary battery in a high capacity environment.

Also, improvements in the tab-lead electrical connection structure may achieve a simple and easy welding process, thereby improving the yield.

Furthermore, the improved lead structure according to the present invention may effectively overcome the problems considerably affecting the performance of the secondary battery such as non-equality of heat generation and non-uniform resistance, thereby maintaining the normal operation of the secondary battery for a long time and improving the characteristics of the secondary battery, resulting in an economical and competitive secondary battery.

What is claimed is:

1. A secondary battery of an improved lead structure comprising:
an electrode assembly including a plurality of cathode plates, a plurality of anode plates, a plurality of electrode tabs including a plurality of cathode tabs formed on the cathode plates, and a plurality of anode tabs formed on the anode plates, and a separator disposed between neighboring cathode plates and anode plates;
a battery casing for receiving the electrode assembly; and
a plurality of electrode leads comprising one or more cathode leads electrically coupled to ones of the plurality of cathode tabs and one or more anode leads electrically coupled to ones of the anode tabs, each of the electrode leads having a length, a width and a thickness;
wherein each of the cathode plates includes multiple cathode tabs extending longitudinally from the cathode plate in a first direction and disposed at different lateral positions along a width of the cathode plate, the multiple cathode tabs being electrically connected to one or more of the cathode leads at a plurality of laterally spaced apart first joints disposed along a width of the one or more cathode leads, the number of first joints being greater than the number of the one or more cathode leads;
wherein each of the anode plates includes multiple anode tabs extending longitudinally from the anode plate in a second direction, the second direction being opposite of the first direction, and disposed at different lateral positions along a width of the anode plate, the multiple anode tabs being electrically connected to one or more of the anode leads at a plurality of laterally spaced apart second joints disposed along a width of the one or more anode leads, the number of second joints being greater than the number of the one or more anode leads;
wherein the electrode tabs include first tabs electrically coupled to upper surfaces of the electrode leads, and second tabs electrically coupled to lower surfaces of the electrode leads, and wherein the first tabs and the second tabs are laterally aligned along widths of the electrode leads such that the first tabs and the second tabs overlap with one another; and
wherein the anode tabs have a same first length and the cathode tabs have a same second length.

2. The secondary battery of an improved lead structure according to claim 1,
wherein the electrode tabs include multiple cathode tabs connected to a selected cathode lead of the one or more cathode leads, a portion of the cathode tabs being electrically connected to one surface of the selected cathode lead and the other portion of the cathode tabs being electrically connected to another surface of the selected cathode lead.

3. The secondary battery of an improved lead structure according to claim 2,
wherein the cathode tabs located above the selected cathode lead are electrically connected to an upper surface of the selected cathode lead, and the cathode tabs located below the selected cathode lead are electrically connected to a lower surface of the selected cathode lead.

4. The secondary battery of an improved lead structure according to claim 1,
wherein the electrode tabs include multiple anode tabs connected to a selected anode lead of the one or more anode leads, a portion of the anode tabs being electrically connected to one surface of the selected anode lead and the other portion of the anode tabs being electrically connected to another surface of the selected anode lead.

5. The secondary battery of an improved lead structure according to claim 4,
wherein the anode tabs located above the selected anode lead are electrically connected to an upper surface of the selected anode lead, and the anode tabs located below the selected anode lead are electrically connected to a lower surface of the selected anode lead.

6. The secondary battery of an improved lead structure according to claim 1,
wherein the electrode assembly includes at least two unit assemblies having a first cathode tab and a second cathode tab, the first cathode tab and the second cathode tab projecting in different directions,
and wherein the first cathode tab of the unit assembly is located above a cathode lead and is electrically connected to the upper surface of the cathode lead, and the second cathode tab of the unit assembly is located below the cathode lead and is electrically connected to the lower surface of the cathode lead.

7. The secondary battery of an improved lead structure according to claim 1,
wherein the electrode assembly includes at least two unit assemblies having a first anode tab and a second anode tab, the first anode tab and the second anode tab projecting in different directions,
and wherein the first anode tab of the unit assembly is located above an anode lead and is electrically connected to the upper surface of the anode lead, and the second anode tab of the unit assembly is located below the anode lead and is electrically connected to the lower surface of the anode lead.

8. The secondary battery of an improved lead structure according to claim 1,
wherein each of the plurality of electrode leads has a thickness of 50 to 500 μm.

9. The secondary battery of an improved lead structure according to claim 1,
wherein each of the plurality of electrode leads has a width of 2 to 20 cm.

* * * * *